US012744709B2

(12) United States Patent
Luthra et al.

(10) Patent No.: US 12,744,709 B2
(45) Date of Patent: Sep. 22, 2026

(54) O-CLOUD NODE UNCORDON

(71) Applicants: RAKUTEN MOBILE, INC., Tokyo (JP); Rakuten Symphony, Inc., Tokyo (JP)

(72) Inventors: Mohit Luthra, Singapore (SG); Awn Muhammad, Singapore (SG); Pankaj Shete, Singapore (SG); Puneet Devadiga, Singapore (SG)

(73) Assignees: RAKUTEN MOBILE, INC., Tokyo (JP); RAKUTEN SYMPHONY, INC., Tokyo (JP)

( * ) Notice: Subject to any disclaimer, the term of this patent is extended or adjusted under 35 U.S.C. 154(b) by 144 days.

(21) Appl. No.: 18/013,777

(22) PCT Filed: Nov. 29, 2022

(86) PCT No.: PCT/US2022/051198
§ 371 (c)(1),
(2) Date: Dec. 29, 2022

(87) PCT Pub. No.: WO2024/043920
PCT Pub. Date: Feb. 29, 2024

(65) Prior Publication Data
US 2024/0250875 A1 Jul. 25, 2024

(30) Foreign Application Priority Data
Aug. 25, 2022 (SG) ........................... 10202250829N

(51) Int. Cl.
*H04L 41/0823* (2022.01)

(52) U.S. Cl.
CPC ................................ *H04L 41/0823* (2013.01)

(58) Field of Classification Search
CPC .................................................. H04L 41/0823
See application file for complete search history.

(56) References Cited

U.S. PATENT DOCUMENTS

| | | | | |
|---|---|---|---|---|
| 7,321,940 | B1 * | 1/2008 | Smith | H04L 47/522 709/240 |
| 8,108,879 | B1 * | 1/2012 | Garlick | G06F 9/52 712/43 |
| 9,311,610 | B2 * | 4/2016 | Steincamp, II | H04L 65/403 |
| 11,800,432 | B2 * | 10/2023 | Ryu | H04W 48/08 |
| 12,143,263 | B2 * | 11/2024 | Bhangu | H04L 41/0803 |

(Continued)

FOREIGN PATENT DOCUMENTS

| | | | |
|---|---|---|---|
| CN | 114401531 A | | 4/2022 |
| WO | WO-2022221260 A1 | * | 10/2022 |

OTHER PUBLICATIONS

Amar Kapadia, "What is the Nephio Project," Jun. 29, 2022, https://www.aarnanetworks.com/post/what-is-the-linux-foundation-nephio-project (Year: 2022).*

(Continued)

*Primary Examiner* — Abdelbasst Talioua
(74) *Attorney, Agent, or Firm* — Sughrue Mion, PLLC

(57) ABSTRACT

A method includes receiving a request to change a deployable state of an open radio access network (O-RAN) cloud (O-Cloud) node, changing the deployable state of the O-Cloud node in response to receiving the request, and transmitting an indication that the deployable state of the O-Cloud node has been modified in response to changing the deployable state.

19 Claims, 6 Drawing Sheets

(56) References Cited

U.S. PATENT DOCUMENTS

| | | | | |
|---|---|---|---|---|
| 2016/0073360 | A1* | 3/2016 | Uchino | H04W 72/21<br>370/329 |
| 2017/0013673 | A1* | 1/2017 | Uchino | H04W 72/21 |
| 2018/0132307 | A1* | 5/2018 | Almeida Neves | H04W 84/005 |
| 2018/0279212 | A1* | 9/2018 | Malik | H04W 48/20 |
| 2019/0116110 | A1* | 4/2019 | Raney | G06F 8/60 |
| 2019/0166549 | A1* | 5/2019 | Ahmavaara | H04W 76/12 |
| 2020/0145965 | A1* | 5/2020 | Luo | H04L 5/0032 |
| 2020/0145991 | A1* | 5/2020 | Abedini | H04B 7/15542 |
| 2020/0145993 | A1* | 5/2020 | Abedini | H04W 40/00 |
| 2020/0146099 | A1* | 5/2020 | Abedini | H04W 72/04 |
| 2020/0174823 | A1* | 6/2020 | Li | G06F 9/4418 |
| 2020/0374358 | A1* | 11/2020 | Miklós | G06F 9/524 |
| 2021/0029025 | A1* | 1/2021 | Abedini | H04W 88/04 |
| 2021/0176823 | A1* | 6/2021 | Mishra | H04W 24/02 |
| 2021/0235323 | A1* | 7/2021 | Parekh | H04W 28/16 |
| 2021/0258866 | A1* | 8/2021 | Chou | H04W 24/02 |
| 2021/0341309 | A1* | 11/2021 | Yuan | G08G 1/096883 |
| 2021/0406035 | A1* | 12/2021 | Price | G06F 11/3055 |
| 2021/0410176 | A1* | 12/2021 | Luo | H04W 72/1263 |
| 2022/0116334 | A1* | 4/2022 | Zhu | H04L 49/901 |
| 2022/0116799 | A1* | 4/2022 | Wang | H04B 7/0452 |
| 2022/0131945 | A1* | 4/2022 | Sapra | H04L 47/12 |
| 2022/0150723 | A1* | 5/2022 | Tsai | H04W 24/02 |
| 2022/0159510 | A1* | 5/2022 | Jang | H04W 28/12 |
| 2022/0166695 | A1* | 5/2022 | Iglesias | H04L 67/1034 |
| 2022/0248296 | A1* | 8/2022 | Merwaday | H04W 48/18 |
| 2022/0253293 | A1* | 8/2022 | Pontecorvi | H04W 12/108 |
| 2022/0291956 | A1* | 9/2022 | Zhang | G06F 9/4881 |
| 2022/0400412 | A1* | 12/2022 | Grayson | H04W 28/16 |
| 2023/0019773 | A1* | 1/2023 | Raymond | H04W 40/02 |
| 2023/0022964 | A1* | 1/2023 | Lins De Medeiros | H04W 28/0231 |
| 2023/0029173 | A1* | 1/2023 | Abedini | H04W 52/325 |
| 2023/0037701 | A1* | 2/2023 | Pinheiro | H04W 88/085 |
| 2023/0050970 | A1* | 2/2023 | Luo | H04W 72/23 |
| 2023/0126312 | A1* | 4/2023 | Tsai | H04L 67/60<br>709/217 |
| 2023/0189317 | A1* | 6/2023 | Narasimha Swamy | G06N 3/044<br>370/329 |
| 2023/0199553 | A1* | 6/2023 | Uziel | H04W 24/02<br>370/230 |
| 2023/0239740 | A1* | 7/2023 | Palermo | H04W 28/18<br>455/456.1 |
| 2023/0379809 | A1* | 11/2023 | Krishan | H04W 28/0284 |
| 2023/0421237 | A1* | 12/2023 | Zhang | H04B 7/088 |
| 2024/0015790 | A1* | 1/2024 | Jamadagni | H04W 24/02 |
| 2024/0054386 | A1* | 2/2024 | Atawia | G06N 3/084 |
| 2024/0196178 | A1* | 6/2024 | Ying | H04W 8/18 |
| 2025/0184086 | A1* | 6/2025 | Yuan | H04L 5/0053 |

OTHER PUBLICATIONS

Amar Kapadia, "What is the Nephio Project," Jun. 29, 2022 (Year: 2022).*

Chang, Kubernetes pod pending failures: How to debug; Published on May 20, 2021 (Year: 2021).*

Emily Chang, Kubernetes pod pending failures: How to debug; Published on May 20, 2021 (Year: 2021).*

Amar, "What is the Nephio Project," Jun. 29, 2022 (Year: 2022).*

Written Opinion dated Mar. 31, 2023, issued in International Application PCT/US2022/051198.

International Search Report dated Mar. 31, 2023, issued in International Application No. PCT/US2022/051198.

O-RAN Alliance, "O-RAN Working Group 6 (Cloudification and Orchestration Workgroup) Study on O-Cloud Energy Savings", O-RAN.WG6.O-Cloud Energy Savings.v01.00 Technical Report, 2022, pp. 1-29.

* cited by examiner

O-CLOUD NODE UNCORDON

CROSS-REFERENCE TO RELATED APPLICATION(S)

This application is a National Stage of International Application No. PCT/US2022/051198 filed Nov. 29, 2022, which is based on and claims priority from Singapore Provisional Patent Application No. 10202250829N, filed at the Singaporean Patent Office on Aug. 25, 2022, the disclosure of which is incorporated by reference herein in its entirety.

TECHNICAL FIELD

Systems, methods, and apparatuses consistent with example embodiments of the present disclosure relate to Open Radio Access Networks (O-RAN) and more specifically to systems, methods, and apparatuses used to uncordon one or more O-RAN Cloud (O-Cloud) nodes.

BACKGROUND

Before the development of O-RAN technology, a radio access network (RAN) used "closed" systems that relied upon proprietary interfaces between radio and baseband units, which restricted a service provider's ability to diversify radio and baseband unit vendors. To provide wireless service to customers, a service provider was required to choose a particular vendor and make substantial investments in that vendor's equipment. Changing from one vendor to another was a burdensome and often cost-prohibitive option for service providers. These disincentives created barriers to entry for new vendors thereby permitting incumbent vendors to maintain high prices, which were ultimately absorbed by the service provider's customers. Additionally, service providers that relied heavily on a single supplier may be exposed to cybersecurity risks associated with potential security breaches to that supplier's software.

O-RAN technology "opened" these previously propriety interfaces and protocols thereby giving service providers greater choice in vendors, increased flexibility in deployment options, and new capabilities such as automation, analytics, and network slicing. O-RAN technology removes barriers to entry, increases supplier competition, promotes innovation, enables agile multi-vendor deployment, lowers equipment cost for service providers (and thus decreasing costs for the service provider's customers), and decreases cybersecurity risks.

Notwithstanding these advantages of O-RAN technology, related art O-RAN technology has nevertheless experienced problems. In particular, current O-RAN technology has failed to provide an efficient way to uncordon O-Cloud nodes.

Improvements to address such inadequacies are presented herein. These improvements may also be applicable to other technologies and telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

According to an exemplary embodiment, a method includes receiving a request to change a deployable state of an O-Cloud node. The method includes changing the deployable state of the O-Cloud node in response to receiving the request. The method further includes transmitting an indication that the deployable state of the O-Cloud node has been modified in response to changing the deployable state.

According to an exemplary embodiment, a method includes transmitting a request to change a deployable state of an O-Cloud node, the request causing the deployable state of the O-Cloud node to change from a cordoned state in which the O-Cloud node is incapable of deploying at least one of an application, a workload, or a network function to an uncordoned state in which the O-Cloud node is capable of deploying at least one of the application, the workload, or the network function.

According to an exemplary embodiment, an apparatus in an open radio access network (O-RAN), the apparatus includes at least one memory configured to store computer program code, and at least one processor configured to access said at least one memory and operate as instructed by said computer program code. The computer program code includes receiving code configured to cause at least one of said at least one processor to receive a request to change a deployable state of an O-Cloud node. The computer program code includes changing code configured to cause at least one of said at least one processor to change the deployable state of the O-Cloud node in response to receiving the request. The computer program code further includes transmitting code configured to cause at least one of said at least one processor to transmit an indication that the deployable state of the O-Cloud node has been modified in response to changing the deployable state.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
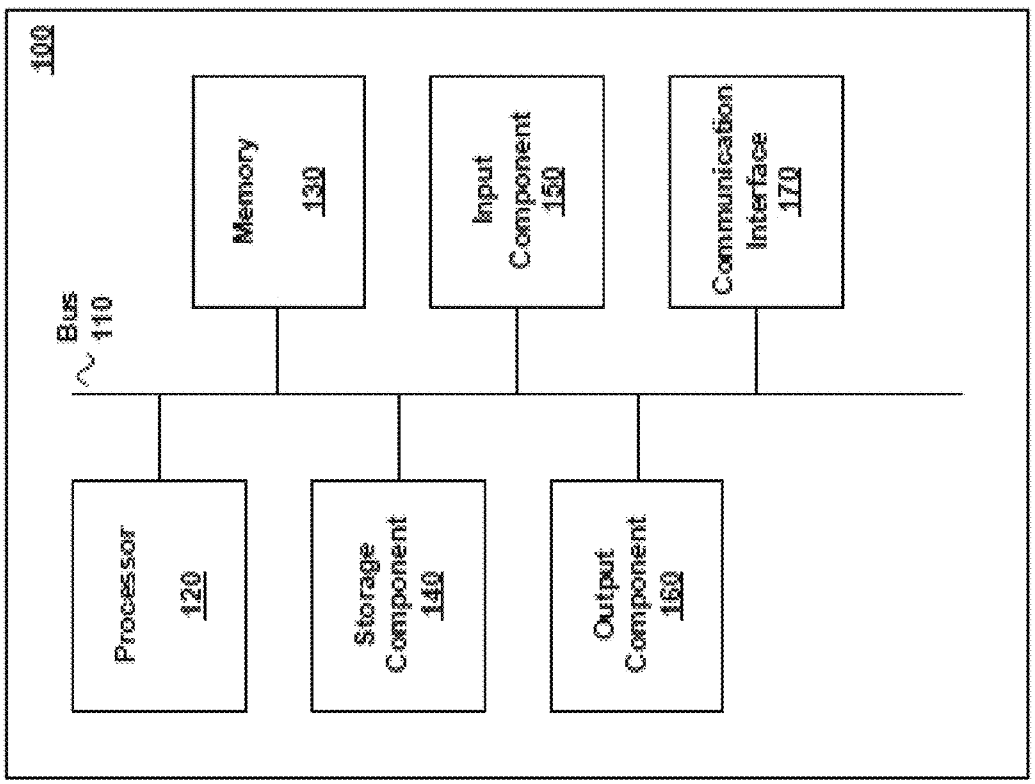
FIG. 1 is a diagram of an example network device in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to systems, methods, and apparatuses used to uncordon one or more O-Cloud nodes. FIG. 1 is a diagram of an example device 100 for implementing the systems, methods, and apparatuses of the present disclosure. Device 100 may implement any of the applications disclosed herein, as well as any O-RAN RIC, and any Artificial Intelligence/Machine Learning (AI/ML) framework. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, and the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may be included in the core network 240 and perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
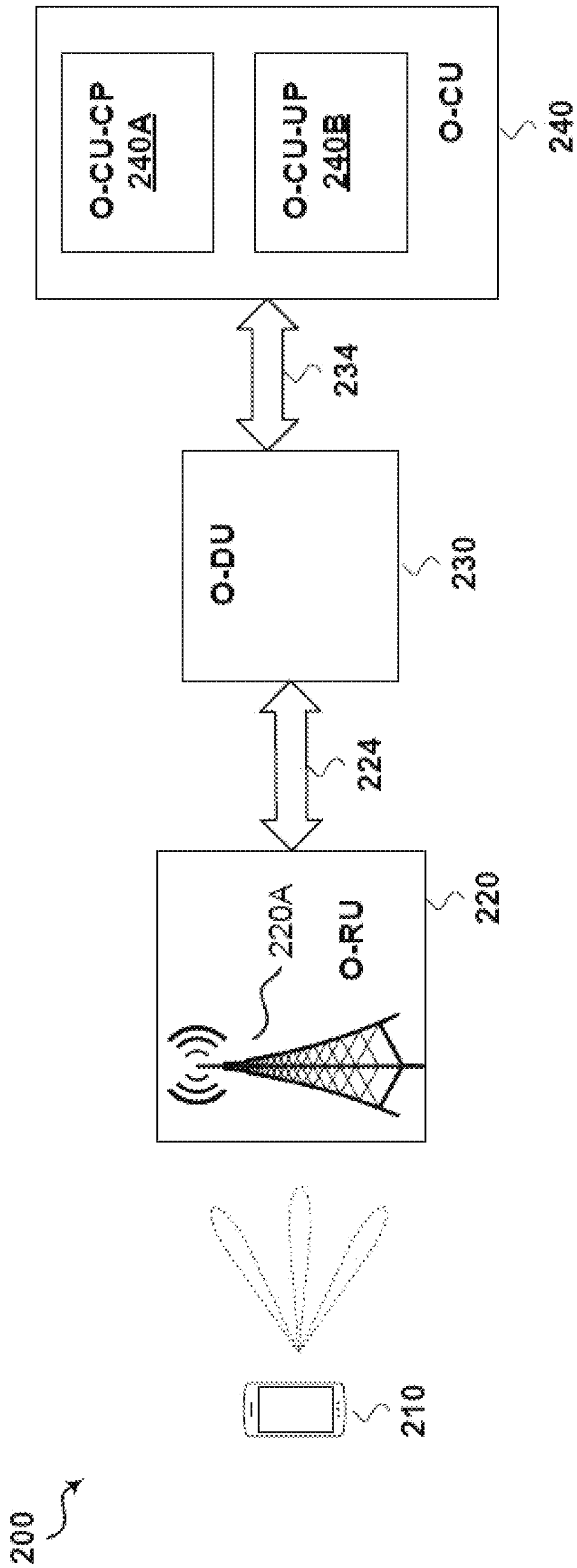
FIG. 2 is a schematic diagram of an example O-RAN communications system in accordance with various embodiments of the present disclosure.

FIG. 2 is a diagram illustrating an example O-RAN communication system 200, according to various embodiments of the present disclosure. The O-RAN communication system 200 may include one or more user equipment (UE) 210, one or more O-RAN Radio Units (O-RU) 220 that includes one or more base stations *220a*, one or more O-RAN Distribution Units (O-DU) 230, and one or more O-RAN Centralized Units (O-CU) 240.

Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IOT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220A of the O-RU 220 may wirelessly communicate with the one or more UEs 210. Each base station of the one or more base stations 220A may provide communication coverage to one or more UEs 210 located within a geographic coverage area of that base station 220A. In some embodiments, as shown in FIG. 2, the base station 220A may transmit one or more beamformed signals to the one or more UEs 210 in one or more transmit directions. The one or more UEs 210 may receive the beamformed signals from the base station 220A in one or more receive directions. Alternatively or additionally, the one or more UEs 210 may transmit beamformed signals to the base station 220 in one or more transmit directions. The base station 220A may receive the beamformed signals from the one or more UEs 210 in one or more receive directions.

The one or more base stations 220A may include macro-cells (e.g., high power cellular base stations) and/or small cells (e.g., low power cellular base stations). The small cells may include femtocells, picocells, and microcells. A base station 220A, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

In some embodiments, the O-RU 220 may be connected to the O-DU 230 via a FH link 224. The FH link 224 may be a 25 Gbps line in which User Plane (U-plane) and Control Plane (C-Plane) packets are downloaded from the O-DU 230 to the O-RU 220. In some embodiments, the O-DU 230 may be connected to the O-CU 240 via a midhaul link 234. The O-CU 240 may include an O-CU Control Plane (O-CU-CP) packet generator 240A and an O-CU User Plane (O-CU-UP) packet generator 240B. C-plane and U-plane packets may originate from the O-CU-CP packet generator 240A and the O-CU-UP packet generator 240B, respectively. These components enable a telecommunications system's radio access network (RAN) to connect the one or more UEs 210 to other parts of the network.

The O-RAN communication system 200 may disaggregate RAN functions via O-CU 240, the O-DU 230, and the O-RU 220. The O-CU 240 may be a logical node for hosting Radio Resource Control (RRC), Service Data Adaptation Protocol (SDAP), and/or Packet Data Convergence Protocol (PDCP) sublayers of the RAN. The O-DU 230 may be a logical node hosting Radio Link Control (RLC), Media Access Control (MAC), and Physical (PHY) sublayers of the RAN. The O-RU 220 may a physical node that converts radio signals from antennas to digital signals that can be transmitted over a "FrontHaul" to the O-DU 230.

Figure 3:
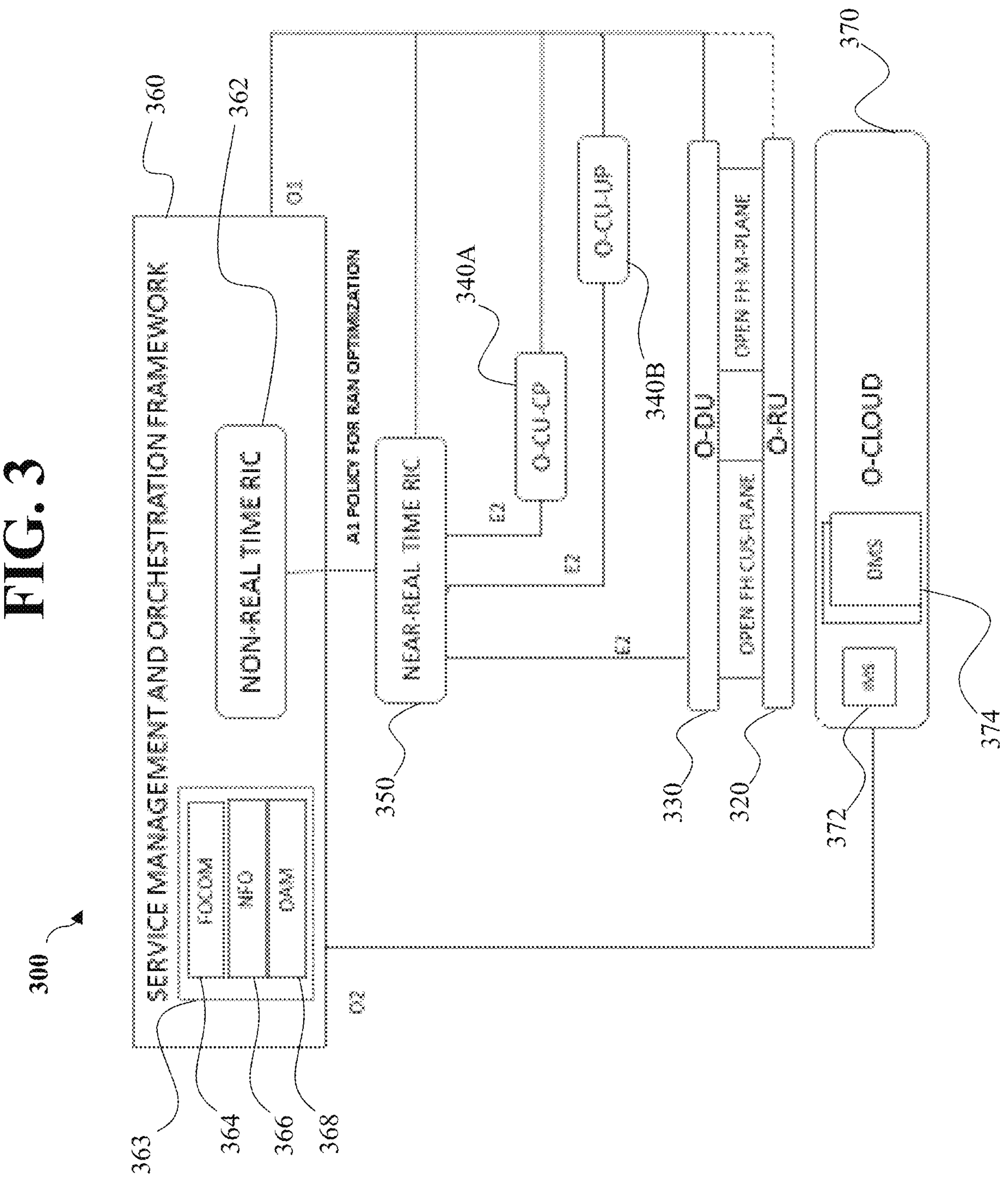
FIG. 3 illustrates an O-RAN architecture in accordance with various embodiments of the present disclosure.

FIG. 3 illustrates an example network architecture 300 that may be used in the implementation of the techniques described herein. The network architecture 300 may include, e.g., an O-RU 320, an O-DU 330, an O-CU-CP 340A, an O-CU-UP 340B, and a service management and orchestration (SMO) 360. RAN functions in the O-RAN architecture 300 may be controlled and optimized by one or more radio access network intelligent controllers (RICs). A RIC is a software-defined component that implements modular applications to facilitate the multivendor operability required in the O-RAN system 300 and that automates and optimizes RAN operations. The RIC is divided into two types: a non-real-time RIC (NRT-RIC) 362 and a near-real-time RIC (nRT-RIC) 350.

The NRT-RIC 362 is the control point of a non-real-time control loop and operates on a timescale greater than 1 second within the Service Management and Orchestration (SMO) framework. Its functionalities are implemented through modular applications called rApps. The functionalities include: providing policy (i.e., a set of rules that are used to manage and control the changing and/or maintaining of the state of one or more managed objects) based on guidance and enrichment across an A1 interface, which is the interface that enables the communication between the NRT-RIC 362 and the nRT-RIC 350. An A1 policy may be a type of declarative policy expressed using formal statements that enable the NRT-RIC 362 within the SMO 360 to guide the nRT-RIC 350, and hence the RAN, towards better fulfillment of the RAN intent): performing data analytics: Artificial Intelligence/Machine Learning (AI/ML) training and inference for RAN optimization: and/or recommending configuration management actions over the O1 interface for managing the operation and maintenance (OAM) 368, which is the interface that connects the SMO 360 to RAN managed elements (e.g., nRT-RIC 350, O-CU-CP 340A, O-CU-UP 340B, O-DU 330, etc.).

The nRT-RIC 350 is located at the edge of the RAN and operates on a timescale between 10 milliseconds and 1 second. The nRT-RIC 350 connects to the O-DU 330, the O-CU-CP 340A, the O-CU-UP 340B, and an open evolved NodeB (O-eNB) (not shown) via the E2 interface. The nRT-RIC 350 uses the E2 interface to control the underlying RAN elements (E2 nodes/network functions (NFs)) over a near-real-time control loop. The nRT-RIC 350 monitors, suspends/stops, overrides, and controls the E2 nodes (O-CU-CP, O-CU-UP, O-DU, and O-eNB) via policies, wherein the O-DU connects to the O-RU 320 over the FrontHaul including a Control User Synchronization (CUS) plane and the Management (M) plane. For example, the nRT sets policy parameters on activated functions of the E2 nodes. Further, the nRT-RIC 350 hosts xApps to implement functions such as quality of service (QOS) optimization, mobility optimization, slicing optimization, interference mitigation, load balancing, security, etc. The two types of RICs work together to optimize the O-RAN. For example, the NRT-RIC 362 provides, over the A1 interface, the policies, data, and AI/ML models enforced and used by the nRT-RIC 350 for RAN optimization, and the nRT returns policy feedback (i.e., how the policy set by the NRT-RIC 362 works).

The SMO 360 framework manages and orchestrates RAN elements 363. Specifically, the SMO 360 includes the Federated O-Cloud Orchestration and Management (FOCOM) 364, a Network Function Orchestrator (NFO) 366 that manages Virtual Machines (VM) based Virtual Network Functions (VNF) (not shown) and container (i.e., instance) (not shown) based VNF, and the OAM 368 as a part of the SMO 360 that manages and orchestrates what is referred to as the O-Ran Cloud (O-Cloud) 370. The O-Cloud 370 is a collection of physical RAN nodes that host the RICs, O-CUs, and O-DUs, the supporting software components (e.g., the operating systems and runtime environments), and the SMO 360 itself. In other words, the SMO 360 manages the O-Cloud 370 from within. The O2 interface is the interface between the SMO 360 and the O-Cloud 370 it resides in. Through the O2 interface, the SMO 360 provides infrastructure management services (IMS) 372 and deployment management services (DMS) 374.

The NRT-RIC 362 may create a RAN optimization policy (i.e., A1 policy for RAN optimization to fulfill the RAN intent). The NRT-RIC 362 may then pass that policy to the nRT-RIC 350 over the A1 interface (i.e., an A1 policy). Upon receiving the A1 policy, the nRT-RIC 350 may perform controls to implement the policy and perform in a control loop in accordance with the policy.

As noted, FIG. 3 provides an exemplary system architecture 300 that may be used in the implementation of the techniques described herein. In particular, e.g., when a node of the O-Cloud 370 requires some kind of maintenance, a drain command and/or a cordon command may be executed. A drain command may safely remove, evict, or transfer pods or instances from a node before maintenance is performed on the node. For example, a drain may delete all pods of a node (but there may be an exception of not deleting "mirror pods"). After a drain command is executed for a particular node, the node may be said to be "cordoned." When a node is in a drained or cordoned state, the node may be live but unavailable for scheduling, deployments, instantiations, etc., of processes or pods. When a node is cordoned, no new instances or pods may be created for the cordoned node, however, maintenance (e.g., hardware maintenance such as changing a network interface card or adding physical memory hardware) may still be performed on that node. In some embodiments, when a node is cordoned, there may be a "taint" associated with such node.

In some embodiments, a cordon command may ensure no new pods or instances are scheduled to a node of interest. That is, execution of a cordon command may place a node in a unplannable or unschedulable state. A cordon command may be used to ensure no new pods or instances will be scheduled to the node of interest. A node of interest may be placed in the unplannable or unschedulable state when the node is being prepared for maintenance. When a node is in a unplannable state, other commands may be used to move pods or instances off of the node of interest such that maintenance may performed on the node. In some embodiments, executing a cordon command removes all pods arranged on the node of interest. As such, a scheduler may list the removed pods/instances on new and/or alternative nodes. In some embodiments, a plurality of nodes (e.g., a node cluster) may be drained or cordoned sequentially or simultaneously. In some embodiments, a node may be marked, flagged, or otherwise given some indicator that the node is in a drain/drained or cordon/cordoned state.

After maintenance on a node is complete, an uncordon command may allow scheduling of the node again. In some embodiments, after maintenance of a node is performed, the node must be uncordoned such that the node may resume workload deployments on the node. After execution of the uncordon command for one or more nodes, pods or instances may be scheduled for such nodes, and pods or instances may be added to or arranged on such nodes. With reference to FIG. 3, the SMO 360 may be used to uncordon one or more O-Cloud nodes. The process of using the SMO 360 to uncordon one or more O-Cloud nodes may be triggered, activated, or caused to occur by either a manual process or an automatic process. After an O-Cloud node is uncordoned, Network Functions (NF) deployments or application deployments may be resumed on that node. For example, one or more and/or one or more VNF deployments (and/or Physical Network Functions (PNFs)) may be resumed on the uncordoned node. In some embodiments, a plurality of nodes (e.g., a node cluster) may be uncordoned sequentially or simultaneously. In some embodiments, some kind of mark, flag, or other indicator may be added or removed to indicate the node is in an uncordon or uncordoned state.

Figure 4A:
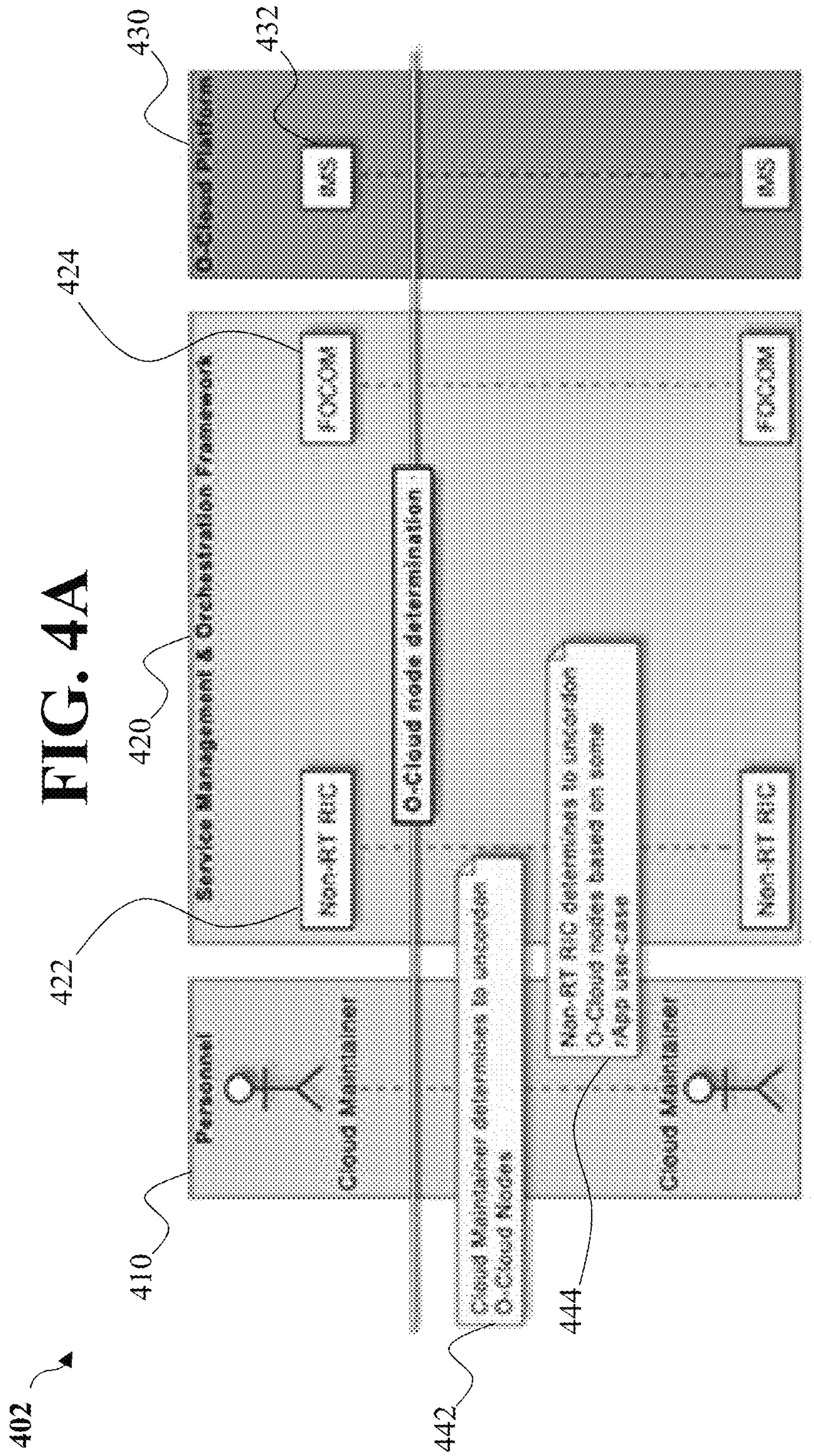
FIGS. 4A and 4B respectively illustrate an O-Cloud identification process and an O-Cloud node uncordon process in accordance with various embodiments of the present disclosure.
Figure 4B:
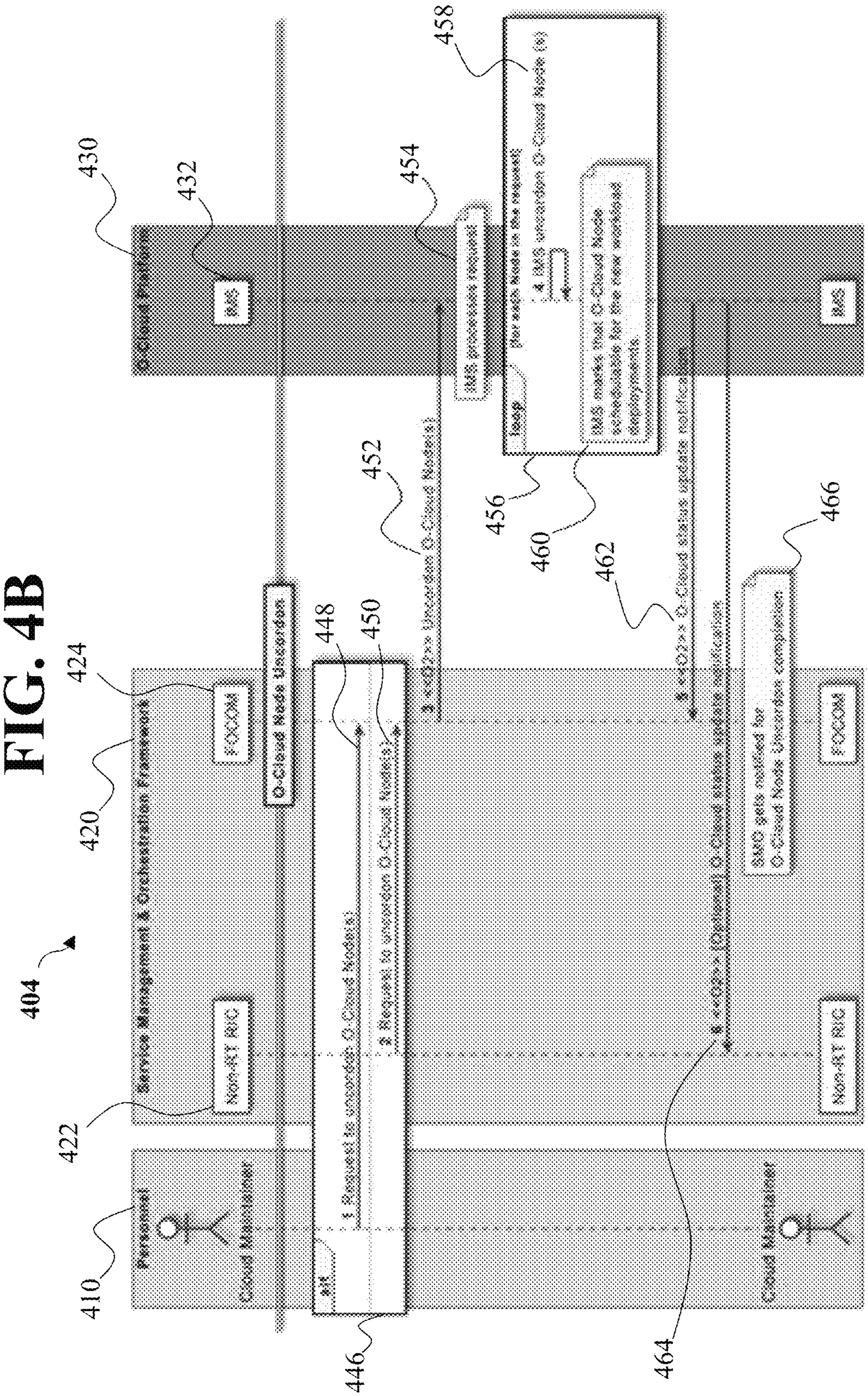

FIGS. 4A and 4B respectively illustrate operations involved in an exemplary O-Cloud determination process 402 and operations involved in an exemplary O-Cloud node uncordon process 404. As shown in FIGS. 4A and 4B, there may be one or more personnel 410 (e.g., a Cloud Maintainer 410), an SMO 420, and an O-Cloud Platform 430. The SMO 420 may have a NRT-RIC 422 and a FOCOM 424, and the O-Cloud Platform 430 may have an IMS 432.

Before the O-Cloud determination process 402 and/or the O-Cloud node uncordon process 404, the system may perform one or more preliminary processes. For example, the system may perform a preliminary process of determining whether the SMO 420 and/or the O-Cloud platform 430 is available. In some embodiments, if a determination is made that the SMO 420 and the O-Cloud platform 430 are available (e.g., having sufficient computational resources accessible), the system proceeds with the O-Cloud determination process 402 and the O-Cloud node uncordon process 404. Alternatively, this process may be omitted and it may be assumed that the SMO 420 and the O-Cloud platform 430 are available. Additionally or alternatively, the system may perform a preliminary process of determining whether O1 and O2 events have been subscribed by the cloud maintainer 410, the NRT-RIC 422, or both. In some embodiments, if a determination is made that there are O1 and/or O2 event subscriptions, the system proceeds with the O-Cloud determination process 402 and the O-Cloud node uncordon process 404.

The O-Cloud node determination process 402 of FIG. 4A may include either or both of operation 442 or operation 444. In operation 442, a cloud maintainer 410 may make a determination to uncordon one or more O-Cloud nodes. In some embodiments, the cloud maintainer 410 making a determination to uncordon one or more O-Cloud nodes is a manual process performed by a person or group of people. Further, the cloud maintainer 410 may receive notifications from the SMO 420, and the cloud maintainer 410 may receive such notifications as a result of being subscribed to receive notifications. The cloud maintainer 410 may make the determination based on the received notifications (e.g., O1 data, O2 telemetry data, etc.).

In operation 444, the NRT-RIC 422 may make a determination to uncordon O-Cloud nodes, e.g., based on an rApp use-case. In some embodiments, the NRT-RIC 422 making a determination to uncordon O-Cloud nodes is an automated process involving little to no human interaction. In some embodiments, the SMO 420 may receive a service request, which may include one or more identifiers (or identification data) of the O-Cloud node(s) to be uncordoned. The SMO 420 may use the received identification data to identify which of the one or more O-Cloud nodes to uncordon. Additionally or alternatively, the process may use other criteria or preprogrammed conditions in making a determination as to which O-Cloud node(s) to be uncordoned as well as when such O-Cloud node(s) are to be uncordoned. For example, the determination process may use one or more AI/ML algorithms, which may be trained using training data: and the determination process may use the trained AI/ML algorithms to make a determination as to when and which O-Cloud node(s) are to be uncordoned (e.g., based on input data such as O1 data, O2 telemetry data, etc.). If and when the cloud maintainer 410 and/or the NRT-RIC 422 makes a determination that one or more O-Cloud nodes are to be uncordoned, the O-Cloud node uncordon process 404 may be performed.

In some embodiments, the NRT-RIC 422 may request to uncordon one or more O-Cloud nodes upon determining that there is an increased computational load on the system, and thus deployments of additional applications may be necessary to address the increased computational load. The NRT-RIC 422 may make such a determination of an increased computational load (or increased CPU usage or increased CPU demand) by, e.g., analyzing current network traffic, network traffic patterns, or via historical network traffic data. In some embodiments, the NRT-RIC 422 periodically assesses computational loads to quickly respond to increased computational demands. By requesting one or more O-Cloud nodes to be uncordoned, the subsequently uncordoned O-Cloud nodes may be used to deploy additional applications to address the increased computational load.

In some embodiments, even if O-Cloud nodes have completed maintenance, the O-Cloud nodes may remain in an uncordoned state until the system makes a determination that such O-Cloud nodes are necessary to address an actual or expected increase in computational demand. By maintaining O-Cloud nodes in an uncordoned state, the system may conserve energy and computational resources thereby optimizing system performance to use an appropriate number of O-Cloud nodes based on actual or expected network traffic. This dynamic allocation of O-Cloud nodes allows the system to both conserve energy when network traffic is low and ramp up resource allocation when network traffic is high thereby providing a system that enables high-quality network performance with optimal energy savings.

The O-Cloud node determination process 404 of FIG. 4B may begin with a request operation 446. In the request operation 446, there may be a request from the cloud maintainer 410, the NRT-RIC 422, or both. In particular, at operation 448, the cloud maintainer 410 may facilitate a request to uncordon one or more O-Cloud nodes. The request of operation 448 may be transferred from a terminal (not shown) operated by the cloud maintainer 410 to the FOCOM 424. Additionally or alternatively, at operation 450, the NRT-RIC 422 may facilitate a request to uncordon one or more O-Cloud nodes. In some embodiments, one or more rApps may use NRT-RIC 422 to transmit a request to uncordon one or more O-Cloud nodes. The request of operation 450 may be transferred from the RT-RIC 450 to the FOCOM 424.

In some embodiments, the NRT-RIC 422 and/or cloud maintainer 410 may receive telemetry data while one or more O-Cloud nodes are in a cordon state. The received telemetry data may be used by the NRT-RIC 422 and/or cloud maintainer 410 to determine whether the O-Cloud nodes have completed maintenance such that the O-Cloud nodes are available to be uncordoned. Additionally or alternatively, the NRT-RIC 422 and/or cloud maintainer 410 may receive troubleshooting data that may be used to determine whether one or more O-Cloud nodes have completed maintenance such that the O-Cloud nodes are available to be uncordoned. In some embodiments, the NRT-RIC 422 and/or cloud maintainer 410 may be required to make a determination or receive an indication that an O-Cloud node has completed maintenance and is available to be uncordoned before a request may be made to uncordon such O-Cloud node.

A determination is made that one or more existing O-Cloud nodes are to be uncordoned (either by the cloud maintainer 410 or by rApps via the NRT-RIC 422) may trigger the FOCOM 424 to uncordon the specified set of O-Cloud node(s). In response to the FOCOM 424 receiving one or more requests to uncordon one or more O-Cloud nodes, the system may perform operation 452 in which the FOCOM 424 facilitates a process to uncordon the one or more O-Cloud nodes identified in the received request(s). The SMO 420 may be incapable, by itself, of performing a process to uncordon an O-Cloud node, and thus the SMO 420 may need to interact with an IMS 432 to uncordon an O-Cloud node. The FOCOM 424 may specifically use the O2 interface to communicate with the IMS 432 of the O-Cloud platform 430 to uncordon one or more O-Cloud nodes. For example, the FOCOM 424 may use O2 IMS services to uncordon the one or more O-Cloud nodes. Operation 452 may be repeated for a number of requests from either or both of the cloud maintainer 410 or the NRT-RIC 422.

In response to the FOCOM 424 communicating with the IMS 432, the system may perform operation 454 in which the IMS 432 processes the one or more requests to uncordon the O-Cloud node(s). The process proceeds to a loop 456. The loop 456 includes performing operation 458 in which the IMS 432 simultaneously or sequentially uncordons each O-Cloud node included in the request(s). The loop 456 further includes operation 460 in which IMS 432 marks each O-Cloud node, which has been uncordoned via operation 458, schedulable for one or more new workload deployments. In some embodiments, operation 458 toggles a flag, which results in an O-Cloud node being indicated as being uncordoned. After every O-Cloud node included in the request(s) have been processed by loop 456 (i.e., being uncordoned by operation 458 and being marked as schedulable for new workload deployments by operation 460), the process proceeds to either or both of operation 462 or operation 464. At operation 462, the IMS 432 transmits one or more O-Cloud status update notifications to the FOCOM 424, e.g., via the O2 interface. At operation 464, the IMS 432 transmits one or more O-Cloud status update notifications to the NRT-RIC 422, e.g., via the O2 interface. In some embodiments, the notification(s) in operation 464 only occur if the NRT-RIC 422 has subscribed to receive notifications from the IMS 432. Either or both of operations 462 or 464 may be included in a notification operation 466 in which SMO 420 is informed or receives a notification of O-Cloud node uncordon completion. After operation 466, the uncordoned O-Cloud nodes are advantageously ready for one or more new workload deployments, i.e., the uncordoned O-Cloud nodes are available The O-Cloud determination process 402 and O-Cloud node uncordon process 404 may be used to effectively perform maintenance on one or more O-Cloud nodes that requires maintenance. Specifically, O-Cloud determination process 402 and O-Cloud node uncordon process 404 may be provide for an ability to quickly and efficiently uncordon O-Cloud nodes such that the O-Cloud nodes may resume NF deployments. The systems, methods, and apparatuses used to provide for this ability to quickly and efficiently uncordon O-Cloud nodes decreases the time that O-Cloud nodes are in an unplannable or unschedulable state thereby ensuring O-Cloud nodes are operating at maximum efficiency, increasing productivity, and providing for optimal performance of the network. As such, network service providers can quickly and efficiently perform updates or maintenance on O-Cloud nodes thereby providing added security and higher quality networks.

Figure 5:
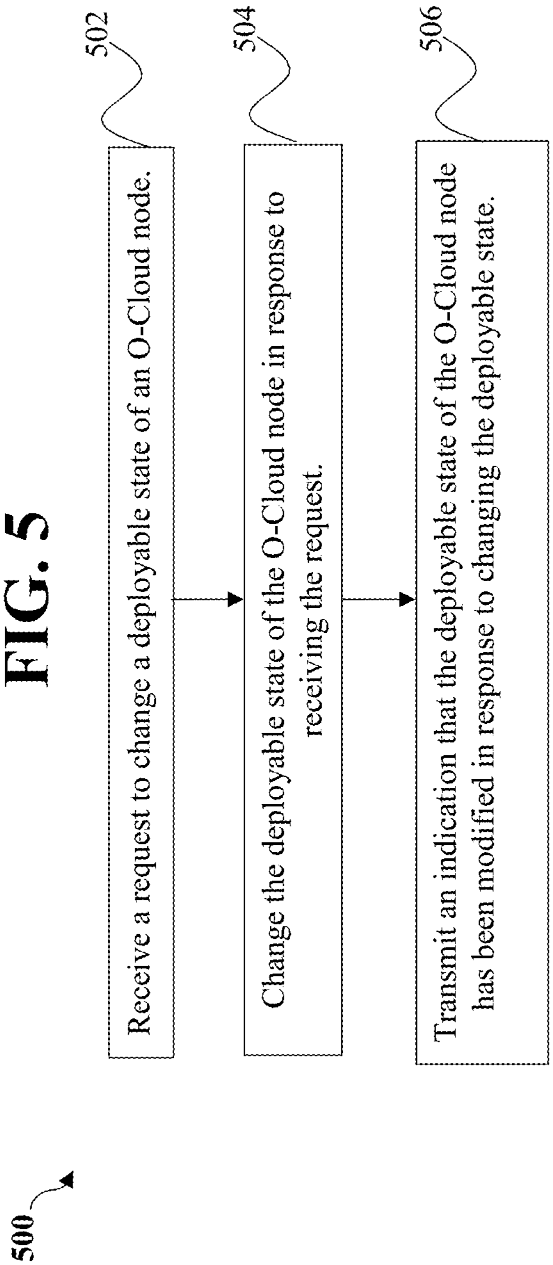
FIG. 5 illustrates an example flow chart of a O-Cloud node uncordon process in accordance with various embodiments of the present disclosure.

FIG. 5 illustrates a flowchart of an embodiment of a O-Cloud node uncordon process 500. The process may start at operation 502 where a request to change a deployable state of an O-Cloud node is received. Next, the process may proceed to operation 504, where the deployable state of the O-Cloud node is changed in response to receiving the request. Finally, the process may proceed to operation 506 where an indication that the deployable state of the O-Cloud node has been modified is transmitted in response to changing the deployable state.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method may include receiving a request to change a deployable state of an O-Cloud node, changing the deployable state of the O-Cloud node in response to receiving the request, and transmitting an indication that the deployable state of the O-Cloud node has been modified in response to changing the deployable state.

(2) The method of feature (1), in which changing the deployable state of the O-Cloud node includes changing the deployable state from a cordoned state to an uncordoned state.

(3) The method according to feature (1) or (2), in which the O-Cloud node is incapable of deploying at least one of an application, a workload, or a network function in the cordoned state, and the O-Cloud node is capable of deploying at least one of the application, the workload, or the network function in the uncordoned state (4) The method according to any one of features (1)-(3), in which changing the deployable state of the O-Cloud node includes changing information related to a flag or marker that indicates the deployable state of the O-Cloud node.

(5) The method according to any one of features (1)-(4), in which the receiving, the changing, and the transmitting are performed by infrastructure management services (IMS) of an O-Cloud platform.

(6) The method according to any one of features (1)-(5), in which receiving the request to change the deployable state of the O-Cloud node includes receiving the request from at least one of a user terminal or a non-real-time radio access network intelligent controller (NRT-RIC).

(7) The method according to any one of features (1)-(6), in which the request is received in response to a determination of an increase in computational load.

(8) A method may include transmitting a request to change a deployable state of an O-Cloud node, the request causing the deployable state of the O-Cloud node to change from a cordoned state in which the O-Cloud node is incapable of deploying at least one of an application, a workload, or a network function to an uncordoned state in which the O-Cloud node is capable of deploying at least one of the application, the workload, or the network function.

(9) The method of feature (8), further including receiving an indication that the deployable state changed to the uncordoned state.

(10) The method of feature (8) or (9), in which receiving the indication includes receiving information related to an updated flag or marker that indicates the deployable state of the O-Cloud node is in the uncordoned state.

(11) The method according to any one of features (8)-(10), further including completing a subscription to receive deployable state change indications, and receiving the indication that the deployable state changed to the uncordoned state based on completing the subscription to receive the deployable state change indications.

(12) The method according to any one of features (8)-(11), in which the transmitting the request further includes transmitting the request from at least one of a user terminal or a non-real-time radio access network intelligent controller (NRT-RIC).

(13) The method according to any one of features (8)-(12), in which the transmitting the request further includes transmitting the request to a federated O-Cloud orchestration and management (FOCOM) component of a service management and orchestration (SMO) framework.

(14) The method according to any one of features (8)-(13), in which the FOCOM communicates with an infrastructure management services (IMS) of an O-Cloud platform that performs the change from the cordoned state to the uncordoned state.

(15) An apparatus including at least one memory configured to store computer program code: and at least one processor configured to access said at least one memory and operate as instructed by said computer program code, said computer program code including: receiving code configured to cause at least one of said at least one processor to receive a request to change a deployable state of an open radio access network (O-RAN) cloud (O-Cloud) node: changing code configured to cause at least one of said at least one processor to change the deployable state of the O-Cloud node in response to receiving the request: and transmitting code configured to cause at least one of said at least one processor to transmit an indication that the deployable state of the O-Cloud node has been modified in response to changing the deployable state

(16) The apparatus of feature (15), in which the changing code is further configured to cause at least one of said at least one processor to change the deployable state from a cordoned state to an uncordoned state.

(17) The apparatus of feature (15) or (16), in which the O-Cloud node is incapable of deploying at least one of an application, a workload, or a network function in the cordoned state, and the O-Cloud node is capable of deploying at least one of the application, the workload, or the network function in the uncordoned state.

(18) The apparatus according to any one of features (15)-(17), in which the receiving code is further configured to cause at least one of said at least one processor to receive the request by an infrastructure management services (IMS) component of an O-Cloud platform, the changing code is further configured to cause at least one of said at least one processor to change the deployable state using the IMS, and the transmitting code is further configured to cause at least one of said at least one processor to transmit the indication from the IMS.

(19) The apparatus according to any one of features (15)-(18), in which the changing code is further configured to cause at least one of said at least one processor to change information related to a flag or marker that indicates the deployable state of the O-Cloud node.

(20) The apparatus according to any one of features (15)-(19), in which the request is received in response to a determination of an increase in computational load.

What is claimed is:

1. A method, comprising:

receiving, by an Infrastructure Management Services (IMS) of an open radio access network (O-RAN) system, a request to change a deployable state of an open radio access network (O-RAN) cloud (O-Cloud) node from a cordoned state to an uncordoned state, the request received over an O2 interface from a Federated O-Cloud Orchestration and Management (FOCOM) of a Service Management and Orchestration (SMO) Framework of the O-RAN system;

changing the deployable state of the O-Cloud node in response to receiving the request; and transmitting, by the IMS to the FOCOM over the O2 interface, an indication that the deployable state of the O-Cloud node has been modified in response to changing the deployable state, wherein changing the deployable state of the O-Cloud node comprises changing the deployable state from the cordoned state to the uncordoned state of the O-Cloud node that has undergone maintenance, wherein the O-Cloud node is incapable of deploying at least one of an application, a workload, or a network function in the cordoned state, and wherein the O-Cloud node is capable of deploying at least one of the application, the workload, or the network function in the uncordoned state.

2. The method of claim 1, wherein changing the deployable state of the O-Cloud node comprises changing information related to a flag or marker that indicates the deployable state of the O-Cloud node.

3. The method of claim 1, wherein the receiving, the changing, and the transmitting are performed by the IMS.

4. The method of claim 1, wherein the request originates from at least one of a user terminal or a non-real-time radio access network intelligent controller (NRT-RIC).

5. The method of claim 1, wherein the request is received in response to a determination of an increase in computational load.

6. The method of claim 1, wherein the request to change a deployable state of an open radio access network (O-RAN) cloud (O-Cloud) node is based on at least one of an O1 interface data and O2 interface data.

7. The method of claim 1, wherein the O-Cloud node is a physical computer comprising an operating system and a central processing unit.

8. The method of claim 1, wherein the deployable state of the O-Cloud node is changed to the uncordoned state after being cordoned and drained.

9. The method of claim 1, wherein the request is received in response to a determination, based on O2 interface telemetry data indicating central processing unit (CPU) usage.

10. The method of claim 1, wherein the request to change a deployable state of an open radio access network (O-RAN) cloud (O-Cloud) node is based on O1 interface data related to network traffic.

11. A method, comprising:

transmitting, by a Federated open radio access network (O-RAN) cloud (O-Cloud) Orchestration and Management (FOCOM) of a Service Management and Orchestration (SMO) Framework of an open radio access network (O-RAN) system, a request to change a deployable state of an open radio access network (O-RAN) cloud (O-Cloud) node from a cordoned state to an uncordoned state, the request causing the deployable state of the O-Cloud node to change from the cordoned state in which the O-Cloud node is incapable of deploying at least one of an application, a workload, or a network function to the uncordoned state of the O-Cloud node that has undergone maintenance, wherein the O-Cloud node is capable of deploying at least one of the application, the workload, or the network function in the uncordoned state, wherein the request is transmitted over an O2 interface to an Infrastructure Management Services (IMS) of the O-RAN system, and receiving, by the FOCOM from the IMS over the O2 interface, an indication that the deployable state changed to the uncordoned state.

12. The method of claim 11, wherein receiving the indication comprises receiving information related to an updated flag or marker that indicates the deployable state of the O-Cloud node is in the uncordoned state.

13. The method of claim 11, further comprising:

completing a subscription to receive deployable state change indications, and receiving the indication that the deployable state changed to the uncordoned state based on completing the subscription to receive the deployable state change indications.

14. The method of claim 11, wherein the transmitting the request comprises transmitting the request based on a message received from at least one of a user terminal or a non-real-time radio access network intelligent controller (NRT-RIC).

15. The method of claim 11, wherein the IMS performs the change from the cordoned state to the uncordoned state based on the request.

16. An apparatus, comprising:

at least one memory configured to store computer program code; and at least one processor configured to access said at least one memory and operate as instructed by said computer program code, said computer program code including:

receiving code configured to cause at least one of said at least one processor to receive, by an Infrastructure Management Services (IMS) of an open radio access network (O-RAN) system, a request to change a deployable state of an O-RAN cloud (O-Cloud) node from a cordoned state to an uncordoned state, the request received over an O2 interface from a Federated O-Cloud Orchestration and Management (FOCOM) of a Service Management and Orchestration (SMO) Framework of the O-RAN system;

changing code configured to cause at least one of said at least one processor to change the deployable state of the O-Cloud node in response to receiving the request; and transmitting code configured to cause at least one of said at least one processor to transmit, by the IMS to the FOCOM over the O2 interface, an indication that the deployable state of the O-Cloud node has been modified in response to changing the deployable state, wherein the changing code is further configured to cause at least one of said at least one processor to change the deployable state from the cordoned state to the uncordoned state of the O-Cloud node that has undergone maintenance, wherein the O-Cloud node is incapable of deploying at least one of an application, a workload, or a network function in the cordoned state, and wherein the O-Cloud node is capable of deploying at least one of the application, the workload, or the network function in the uncordoned state.

17. The apparatus of claim 16, wherein: the changing code is further configured to cause at least one of said at least one processor to change the deployable state using the IMS.

18. The apparatus of claim 16, wherein the changing code is further configured to cause at least one of said at least one processor to change information related to a flag or marker that indicates the deployable state of the O-Cloud node.

19. The apparatus of claim 16, wherein the request is received in response to a determination of an increase in computational load.

* * * * *